C. J. HOSEK.
EXTENSION WAGON POLE.
APPLICATION FILED FEB. 29, 1912.
1,049,717.
Patented Jan. 7, 1913.
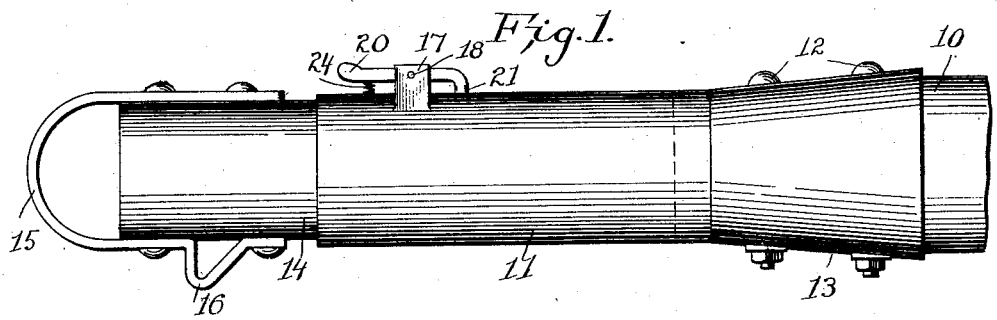
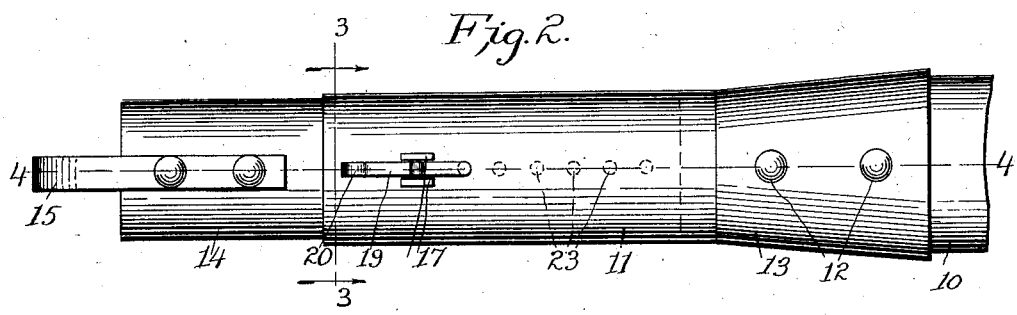
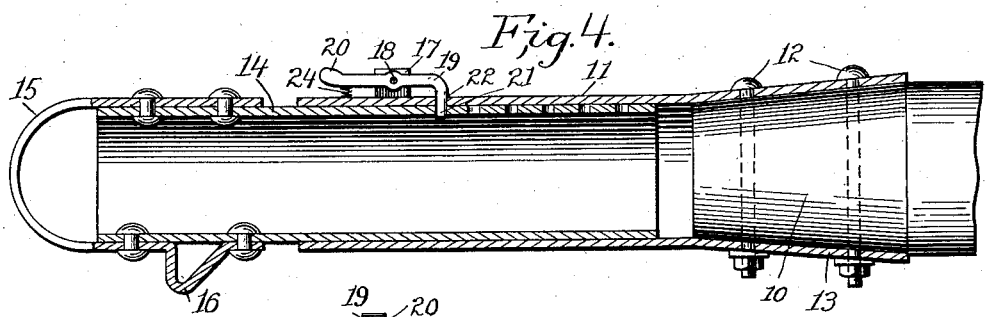
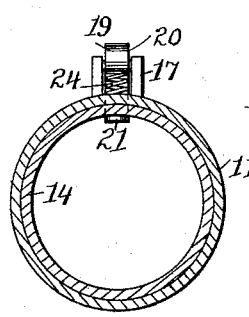
Witnesses
R. N. Jones.
Harry M. Feet
Inventor
C. J. Hosek.
By Chandlee Chandlee
Attorney

UNITED STATES PATENT OFFICE.

CHARLEY J. HOSEK, OF OLIVIA, MINNESOTA.

EXTENSION WAGON-POLE.

1,049,717.  Specification of Letters Patent.  Patented Jan. 7, 1913.

Application filed February 29, 1912. Serial No. 680,567.

*To all whom it may concern:*

Be it known that I, CHARLEY J. HOSEK, a citizen of the United States, residing at Olivia, in the county of Renville, State of Minnesota, have invented certain new and useful Improvements in Extension Wagon-Poles; and I do hereby declare the following to be a full, clear, and exact description of the invention, such as will enable others skilled in the art to which it appertains to make and use the same.

This invention relates to improvements in wagon poles, and has particular reference to an extension tip therefor.

The principal object is to provide a tip for a wagon pole which is simple in construction, and which may be quickly and easily adjusted according to the length desired.

Another object is to provide a device of this character which may be quickly and easily applied to the ends of the ordinary poles now in use.

Other objects and advantages will be apparent from the following description and particular reference to the accompanying drawings.

In the drawings, Figure 1 is a side elevation of the device attached to the end of the pole. Fig. 2 is a top plan view. Fig. 3 is a transverse section on the line 3—3 of Fig. 2 looking in the direction of the arrows. Fig. 4 is a vertical longitudinal section on the line 4—4 of Fig. 2.

Referring particularly to the drawings 10 represents the end of a wagon pole, to which my device is attached. Slipped on the end of the pole, and secured by means of the bolts 12 is a sleeve 11. This sleeve has a flared rear end 13 to facilitate the introduction of the end of the pole 10. The opposite end of the sleeve 11 is open, and is adapted to receive slidably therein the extension sleeve 14, which carries on its outer end the yoke attaching loop 15, and the foot 16. Struck up from the sleeve 11 are the parallel perforated lugs 17, in the perforations of which is journaled the pivot pin 18 of the dog 19. This dog has a finger grip 20 at one end and a downturned nose 21 on its opposite end, said nose passing through an opening 22 in the sleeve 11. The sleeve 14 has a longitudinal series of openings 23 which are adapted to register with the opening 22, so that the nose 21 will pass therethrough, and hold the sleeve 14 from longitudinal movement in the sleeve 11. Between the finger grips 20 and the dog 19, and the sleeve 11 is arranged the coil spring 24 for normally holding said end of the dog upward to depress the nose end through the opening in the sleeve.

It will thus be seen, by means of this device, when it is desired to change a pair of horses from a vehicle in which the pole is longer or shorter, it is not necessary to adjust the traces, but to adjust the sleeve 14 to the proper distance to accommodate the traces.

What is claimed is:—

An attachment for a vehicle pole comprising a sleeve detachably secured at its inner end to the pole, an extension sleeve telescoped within the first-mentioned sleeve, said extension sleeve having a longitudinal series of openings adapted for successive registry with the opening in the first-mentioned sleeve to receive the nose of the dog therethrough, said sleeve having a pair of parallel apertured lugs struck up therefrom, a spring-pressed dog pivoted between the lugs, said sleeve having an aperture adjacent the lugs, the nose on the dog protruding through the aperture and one of the openings of the extension sleeve.

In testimony whereof, I affix my signature, in presence of two witnesses.

CHARLEY J. HOSEK.

Witnesses:
A. N. NELSON,
C. A. HEINS.

Copies of this patent may be obtained for five cents each, by addressing the "Commissioner of Patents, Washington, D. C."